United States Patent Office 2,909,567
Patented Oct. 20, 1959

2,909,567

ACYCLIC HYDRAZINIUM SALTS

Bernard Rudner, Silver Spring, Md., assignor to W. R. Grace & Co., New York, N.Y., a corporation of Connecticut No Drawing. Application October 29, 1957
Serial No. 693,027

11 Claims. (Cl. 260—569)

This invention relates to quaternary nitrogenous salts. In one specific aspect, it relates to quaternized derivatives of substituted hydrazines. In still another aspect, it relates to novel acyclic fatty oxyalkyl- and polyoxyalkyl-hydrazinium salts.

Heretofore, quaternary hydrazinium salts have been obtained on only a laboratory scale. A known preparation of these interesting compounds comprises the reaction of 1,1-disubstituted hydrazines with alkylating agents, e.g. methyl chloride. Because of the extreme difficulties involved in preparing the parent hydrazines and the limitations of their final alkylation (see O. Westphal, Berichte der Deutschen Chemischen Gesellschaft, 74: 759 et. seq., 1365 et. seq. (1941)), only limited types of hydrazinium chlorides have been heretofore available. Using Westphal's method it is obvious that the preparation of any specific hydrazinium cation depends upon the availability of the substituted hydrazine, as well as the ablity of that substituted hydrazine to undergo alkylation with the necessary alkyl halide. Among the compounds discovered by Westphal were the trihexylhydrazinium chloride, the dodecyldimethylhydrazinium chloride, the hexadecyldimethylhydrazinium bromide and the hexadecyldimethyl-hydrazinium iodide. Because of the inherent limitation of his alkylation reaction, Wesphal found it impossible to prepare hydrazinium chlorides of greater chain length than the doceyldimethylhydrazinium salt. He was more successful using methyl bromide and methyl iodide as alkylating agents; however, he did not prepare hydrazinium salts having a carbon chain longer than 16 carbon atoms. Since long chain alkyl substituted hydrazines are not readily available, the only known compounds of this particular type are those prepared by Westphal. We have discovered certain distinctly different acyclic hydrazinium salts which vary both in their structure and in their utility from the compounds of Westphal. The vast utility of our novel acyclic hydrazinium salts will be discussed in detail infra. This application is a continuation-in-part of my copending application S.N. 641,810, filed February 25, 1957.

It is, therefore, an object of the present invention to provide a new generic class of acyclic hydrazinium salts which, because of their unique properties and utility, are commercially acceptable as dye, detergent, phamaceutical and resin intermediates as well as for a variety of other purposes.

In accordance with the present invention we have made available a new generic class of useful hydrazinium chlorides having the formula:

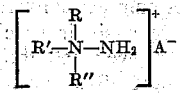

In the above formula R is an acyclic alkyl, alkenyl or alkadienyl residue of 8 to 24 carbon atoms. R' is hydroxyloweralkyl, hydroxyloweralkoxyloweralkyl or hydroxypolyloweralkoxyloweralkyl. R" may be hydroxyloweralkyl, hydroxyloweralkoxyloweralkyl or hydroxypolyloweralkoxyloweralkyl. R" in addition may be an aliphatic hydrocarbon residue of less than 25 carbon atoms. Such a residue includes alkyl, alkenyl and alkadienyl radicals fitting this description. R" may also be a benzyl or halobenzyl radical. "A" is halide, sulfate, phosphate, nitrate or lower alkanoate.

It has recently been discovered that chloramine will react with tertiary amines to form 1,1,1-trisubstituted hydrazinium chlorides. This new reaction presents practically limitless possibilities for the preparation of novel and interesting chemical compounds, which, because of their structure and inherent physical properties, have a wide range of uses. Tertiary amines are readily available bases. Chloramine is an excellent reagent since it can be economically obtained in commercial quantities by using the well known process of Harry H. Sisler et al., described in U.S. Patent No. 2,710,248 where chlorine and ammonia are reacted in the vapor phase to produce chloramine (monochloramine).

By treating a particular class of tertiary amines having a structure which is embraced by the general formula supra, with chloramine, we have discovered the new generic class of hydrazinium chlorides referred to hereabove. The corresponding salts of the present invention are preparable by metathesis.

In making the chloride compounds of the present invention it is ually suitable to contact chloramine with a solution of the selected tertiary amine, allow the reaction to proceed until the desired quantity of chloramine is consumed and then isolate and purify the resultant hydrazinium chloride by standard laboratory techniques. While chloramine is most advantageously prepared in the form of a gaseous chloramine-ammonia-nitrogen stream obtained from a generator constructed according to the teachings of Sisler et al., other methods are equally adaptable for the purpose of the present invention. For instance, chloramine can be made by reacting chlorine with an excess of ammonia in a halogenated hydrocarbon solvent under controlled conditions of mixing at low temperatures. Such a procedure is fully described in U.S. Patent No. 2,678,258 to John F. Haller. Another effective procedure is that of Coleman et al., fully described in Inorganic Syntheses, vol. I, 59 (1939). Alternately, the compounds of the present invention can be made directly by the procedure described in the copending application of Bernard Rudner, Serial No. 605,230, filed August 20, 1956, which teaches the reaction of chlorine, ammonia and the tertiary amine in the presence of excess ammonia. For simplicity, when both the amine and the product are soluble in the same inert solvent, we have found the Rudner method to be a preferred technique.

Tertiary amines suitable for the purpose of the present invention are shown hereunder in Table I. These suggested amines are intended merely to be illustrative, since it is obvious that the homologs of these compounds embraced by the general formula set forth above would be equally applicable in the production of individual species of our new and novel class.

TABLE I

| Parent amine | Product hydrazinium Salt |
|---|---|
| 1. Octyldiethanolamine | 1,1-bis-(2-hydroxyethyl)-1-n-octylhydrazinium chloride. |
| 2. Di(2-ethylhexyl) ethanolamine | 1,1-bis-(2-ethylhexyl)-1-(2-hydroxyethyl) hydrazinium chloride. |
| 3. Dinonylaminopropanol | 1,1-bis-n-nonyl-1-(3-hydroxypropyl) hydrazinium chloride. |
| 4. Decyliminobis-(4-butanol) | 1,1-bis-(4-hydroxybutyl)-1-decylhydrazinium chloride. |
| 5. Undecenyldiethanolamine | 1,1-bis-(2-hydroxyethyl)-1-(10-undecenyl) hydrazinium chloride. |
| 6. N - (2,4,4,6,6 - pentamethylheptyl - 2) - N - methylhydroxyethylamine. | 1 - (2,4,4,6,6 - pentamethylheptyl - 2) - 1 - (2 - hydroxyethyl) - 1 - methylhydrazinium chloride. |
| 7. Dodecyliminobis (2-propanol) | 1-dodecyl-1,1-bis-(2-hydroxypropyl) hydrazinium chloride. |
| 8. Didodecylethanolamine | 1,1-didodecyl-1-(2-hydroxyethyl) hydrazinium chloride. |
| 9. Dilaurylethanolamine | Do. |
| 10. Ditetradecylaminopropanol | 1-(3-hydroxypropyl)-1,1-ditetradecylhydrazinium chloride. |
| 11. Pentadecenyliminobisethanol | 1,1-bis-(2-hydroxyethyl)-1-(6-pentadecenyl) hydrazinium chloride. |
| 12. Cetylmethylhydroxybutylamine | 1-cetyl-1-(hydroxybutyl-3)-1-methylhydrazinium chloride. |
| 13. Octadecyldiisopropanolamine | 1,1-bis-(2-hydroxypropyl)-1-(9-octadecenyl) hydrazinium chloride. |
| 14. Dioctadecylaminoethanol | 1,1-dioctadecyl-1-(2-hydroxyethyl) hydrazinium chloride. |
| 15. Dodecyliminobis (2-hydroxyethane) | 1,1-bis-(2-hydroxyethyl)-1-dodecylhydrazinium chloride. |
| 16. Dihexadecylhydroxy (tetraethoxy) ethylamine | 1,1-dihexadecyl-1-(hydroxytetraethoxyethyl) hydrazinium chloride. |
| 17. Methyloctyl (2-hydroxyethyl) amine | 1-methyl-1-octyl-1-(2-hydroxyethyl) hydrazinium chloride. |
| 18. 2-ethylhexylimino-bis-(3-propanol) | 1-(2-ethylhexyl)-1,1-bis-(3-hydroxypropyl) hydrazinium chloride. |
| 19. Hexadecylimino-bis-(tetra-2-propoxy-2-propanol) | 1-hexadecyl-1,1-bis-(2-hydroxytetra-2-propoxypropyl) hydrazinium chloride. |
| 20. Methyltetracosanyl (hydroxytetradecaethoxyethyl) amine | 1-methyl-1-(hydroxytetradecaethoxyethyl)-1-tetracosanylhydrazinium chloride. |
| 21. Octadienylimino-bis-tetradecaethoxyethanol | 1,1-bis-(hydroxytetradecaethoxyethyl)-1-octadienylhydrazinium chloride. |
| 22. N - benzyl - N - 2,3 - dihydroxypropyl - N - 2 - methylpentadecylamine. | 1-benzyl-1-(2,3-dihydroxypropyl)-1-(2-methylpentadecyl) hydrazinium chloride. |
| 23. Octadecadienyl - bis - (hydroxytetracosanethoxyethyl) - amine. | 1,1 - bis - (hydroxytetracosanethoxyethyl) - 1 - octadecadienyl)hydrazinium chloride |
| 24. 3,5-dichlorobenzyloctylhydroxyethylamine | 1-(3,5-dichlorobenzyl)-1-octyl-1-(2-hydroxyethyl)hydrazinium chloride. |

The amines set forth in Table I, supra, may be divided into two general types; viz: (1) those synthetically derived from fats and (2) those synthetically derived from lower olefins (petrochemicals).

Type 1 amines are prepared as follows: naturally occurring fatty glycerides are hydrolyzed to acyclic acids RCOOH, where R is a paraffinic or olefinic residue having from 7 to 21 carbon atoms. These acids are treated with ammonia in the presence of a catalyst to give a cyanide RCN, often by way of amide formation. This product is hydrogenated catalytically to convert the cyanide to a mixture containing primary and secondary amines plus some tertiary amine. The primary and secondary amines thus formed are further alkylated as discussed below. It is noteworthy that the fatty amines are often obtained as mixtures. The coconut oil fatty acyclic residue is 8% octyl, 9% decyl, 47% dodecyl, 18% tetradecyl, 8% hexadecyl, 5% octadecyl, 5% octadecenyl; the soy residue is 10% hexadecyl, 10% octadecyl, 35% octadecenyl, 45% octadecadienyl; tallow is 30% hexadecyl, 25% octadecyl, 45% octadecenyl. It is, of course, possible by fractional distillation or other procedures to get nearly pure homologues from these fatty amine mixtures. The fatty amines may also be hydrogenated to convert them to mixed alkyl residues substantially free of unsaturated compounds.

The second general type of amine is often prepared as follows: propylene, butylene, isobutylene, can be dimerized, trimerized, etc., and the resulting olefinic mixture may be condensed with e.g. urea, ammonia, hydrogen cyanide or amines to give eventually primary or secondary amines which are further alkylated to the tertiary amine as discussed below. Polymerization of the lower olefin gives a mixture of branched chain alkenes of varying degrees of polymerization. This combined with the isomerization due to several possible locations of the final double bond accounts for the fact that commercial products are usually mixtures of amines. Branched chain amines are more oil soluble and less water soluble than the corresponding fatty or unbranched amines. A typical process is outlined below:

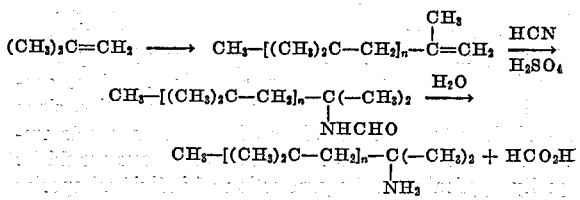

Tertiary amines suitable as starting materials for the practice of this invention are commercially available.

They are generally manufactured by the reaction of ethylene oxide and propylene oxide on the primary and secondary amines whose preparation was described above.

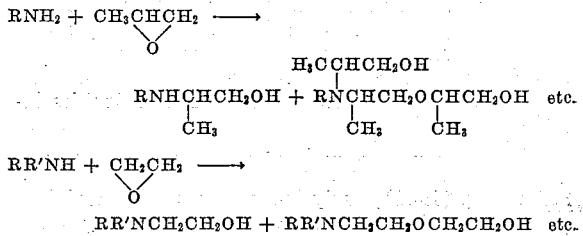

Customarily, oxyalkylation is done to a fixed epoxide-amine molar ratio. But oxiranes are highly reactive and the reaction cannot be controlled to give exclusively the desired product. Even when the alkyl chains (R and R') are derived from a single component, oxyalkylation gives a multiplicity of products. A detailed example will be helpful. When one mol of pure n-$C_{12}H_{25}NH_2$ takes up 13 mols of $C_2H_4O$, the average structure $$C_{12}H_{25}N[(C_2H_4O)_{6.5}H]_2$$

(chemically impossible) can be written for the product. What actually results is a complex mixture of $$C_{12}H_{25}N(C_2H_4O)_xH$$
$$\qquad\qquad |$$
$$\qquad\quad (C_2H_4O)_zH$$

where $x$ and $z$ can have any value but their overall sums must average 13 (the number of mols of $C_2H_4O$ taken up). Thus a graph of the sums of $x+y$ will follow a Boltzmann distribution curve when plotted against the amount of a given species present in the reaction mixture.

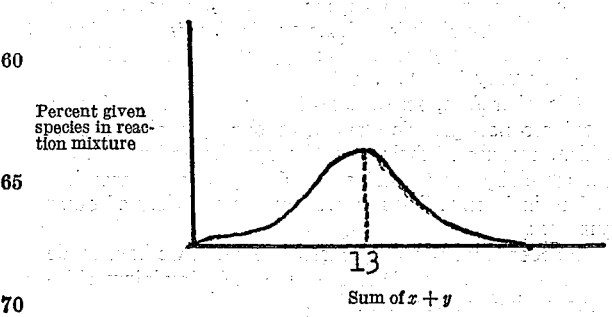

Such a mixture is not commercially resolvable but is referred to as if it were a single species. For example, the manufacturer might well call the above ethoxylated amine, EA 12/13, where 12 is the average length of R in the alkyl chain and 13 the mols of $C_2H_4O$ taken up.

The steric factor in oxyalkylation is fairly important. For example, the reaction under ordinary conditions of isobutylene oligomers with ethylene oxide gives only the secondary amine.

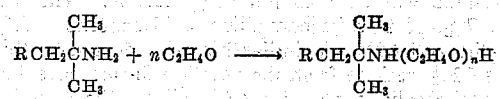

The remaining amine hydrogen is still available for alkylation by other techniques; the resultant tertiary amines are also useful as starting materials in the practice of my novel invention.

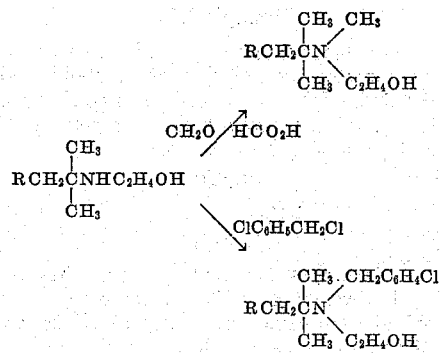

These amines are still sterically hindered and react slowly with chloramine.

In discussing the several methods by which chloramine may be made available for reaction with the tertiary amine, we indicate choice of the reaction medium could be varied extensively. We have successfully obtained our novel compounds by conducting the reaction of chloramine and the appropriate tertiary amine in anhydrous solution using as a solvent either an excess of the reactant amine or an unreactive organic liquid. The reaction may also be carried out in aqueous solution if such conditions appear to be preferable. The term "unreactive" as applied to the organic liquid solvent is intended to embrace those solvents that do not react preferentially with chloramine, ammonia or the reactant amine under the conditions employed. It is obvious, therefore, that the choice of solvent is one of economy and simplicity. For good absorption (and, therefore reaction) it may be desirable to bubble chloramine through a long column of solution comprising a tertiary amine dissolved in a relatively cheap inert solvent. Solvents which serve this purpose include hydrocarbons, e.g. heptane, cyclohexane, benzene, xylene and the like; ethers, e.g. diethyl ether, diamyl ether, dioxane and anisole; amides, e.g. dimethylformamide and dimethylacetamide; halohydrocarbons, e.g. chloroform, carbon tetrachloride, trichloroethylene, trichlorobenzene; and nitroaromatics, e.g. nitrobenzene. For special purposes water and other hydroxylic solvents such as ethanol and 2-ethoxyethanol may be used.

The novel salts (other than chloride) of the instant invention are preferably, but by no means necessarily, prepared by the metathetical reaction between the hydrazinium chloride and an alkali metal salt of the desired anion. In short, the method comprises mixing aqueous solutions of the reactant salts using heat if necessary, or mixing solutions in organic solvents of the two compounds. As an alternative procedure, the two dry components can be melted together to form my novel compounds. The desired hydrazinium salt is then isolated and purified using standard techniques more fully described in the specific examples that follow. It is often unnecessary, in specific instances, and therefore undesirable in those instances, to isolate the hydrazinium chloride before conversion to the required salt. It may be desirable to convert the halide salt to the hydroxide with moist silver oxide; neutralization with an acid gives the hydrazinium salt of that acid free of extraneous anions.

Because of the balanced interplay of polar and non-polar groupings, my novel compounds have general surfactant properties. Salts with 1-5 ethylene oxide residues have good emulsifying properties. For example, very good oil-in-water emulsions are obtained with kerosene; excellent water-in-oil emulsions result with mineral or soybean oil, which may be used as anti-static wool lubricants. The hydrophile-lipophile balance is modified by the addition of ethylene oxide residues. When less ethylene oxide is present in the compound, water-in-oil emulsions are favored and less chance of salting out of the emulsion is possible (40% oil, 10% emulsifier and 50% water constitute one such formulation). Unlike the amine acetates, these salts are not alkali sensitive and can, therefore, be used in paint stripping formulations. Tallow-bis-hydroxypolyethoxyethylhydrazinium chloride, aqueous sodium hydroxide and a solvent like Cellosolve would constitute such a formulation. Not only do these salts have the power to emulsify oily materials but they are capable of peptizing aggregates of solid particles. The increased amount of oxygen present in the molecule as compared to the more aliphatic hydrazinium salts of my copending applications, S.N. 641,271 and S.N. 641,810, decreases the softening power and antibacterial properties of the compounds. The presence of ethereal oxygen has other advantages which will be illustrated below. As expected, the presence of ethoxy groups increases both the water solubility and water dispersability of the oxyalkylhydrazinium salts.

My novel compounds produce brightly colored dye stuffs when treated with aqueous solutions of acid dyes (i.e. those substances containing sulfonic, carboxylic or other acid groups). The resulting products, the hydrazinium salts of the acid dyes, vary in physical properties with the chain length of the R group and the particular dye used. Products ranging from solvent-soluble dyes to insoluble pigments have been prepared in this manner. Saturated long-chain hydrazinium salts of instant invention having a minimum number of hydroxyl groups, in general, form water-insoluble solvent-soluble salts useful in dopes, lacquers and in ballpoint pen ink. In the latter case, the hydrazinium portion of the molecule apparently functions to promote the smooth flow of ink and cleanliness of the nub. Certain salts are exceptionally useful in making flushed pigments (where wet pigment filter cake is simultaneously freed of water and dispersed in the oil matrix to be used by the printer). When Peacock blue is made by the standard process of laking Neptune blue (Color Index No. 671) with barium chloride on freshly precipitated alumina, it is less readily flushed than a similar preparation containing less than 5% by weight of 1,1-bis-(2-hydroxyethyl)-1-octadecylhydrazinium chloride.

Since the novel hydrazinium salts possess considerable anti-oxidant power as well as affinity for metals, they form emulsions which are particularly useful as cutting oil additives for machine-shop work. The products also exhibit added utility when used in electroplating processes. For instance, the addition of a small amount of any of my acid insensitive salts to an electroplating solution results in a deposition of a clearer, brighter more coherent covering film on the electroplated object. Moreover, my compounds are excellent dispersing agents for water insoluble components in electroplating. My compounds are also good additives for froth flotation agents. In general, froth flotation agents do not possess good wetting out (viz: surfactant characteristics). The addition of any one of my novel compounds to such an agent greatly enhances its ability to wet the surfaces of the air bubbles formed during froth flotation. This effect is attributed to the presence of ether linkages and hydroxyl groups in my novel compounds.

The scope and utility of my invention is further illustrated by the following examples:

Example I

A chloramine generator was constructed according to the teachings of Sisler et al., supra. The generator consists of a horizontal Erlenmeyer flask, the bottom of which contains an outlet tube which is directed into the reactor containing liquid tertiary amine. Ammonia and chlorine (which may be diluted with nitrogen) are introduced separately into the top of the flask through concentric conduits. Chloramine and ammonium chloride are formed in the flask at the point where the chlorine and ammonia vapors come into contact. A rod is provided in the chlorine inlet stream to prevent any plugging of that stream with ammonium chloride. The outlet end of the flask is masked with glass wool to collect any ammonium chloride particles which otherwise would be carried into the reaction mixture. The chloramine yield for any one set of gas flow meter readings is determined by removing the reactor and generating the chloramine directly into a series of three chilled traps. Under the conditions of chloramine generation, only ammonia, chloramine, and nitrogen can pass through the glass wool into the traps. Since the traps are maintained at at least $-70°$ C., the ammonia and chloramine condense therein and react relatively slowly (compared to the chlorine-ammonia reaction velocity) to form nitrogen, possibly hydrazine and ammonium chloride. By allowing the low temperature condensate to come to room temperature slowly, the chloramine is converted quantitatively to non-volatile (at 20–30° C.) ammonium chloride, while the volatile bases escape by volatilization. Therefore titration of the white residue (obtained on evaporation of the condensate) for chloride gives a direct measure of the chloramine generated. This can be related back to a measure of the chlorine used to obtain the chloramine yield. There is an alternate procedure which is suitable for use when chloramine is actually being consumed by reaction with a tertiary amine. The amount of chlorine used in a run, which is the limiting reagent quantity for yield calculation, can be measured directly, e.g., by weight of the chlorine cylinder before and after use, or by use of flow meters. The amount of ammonium chloride retained within the generator is determinable by titrating an aliquot of the aqueous solution of all of the solid remaining within the chloramine generator after the reaction has been completed. The chloramine yield, expressed as percent of the theoretical yield, can then be calculated from the formula:

$$\text{Percent} = \frac{(A-B)200}{A}$$

where A is the total number of mols of chlorine passed into the generator and B is the number of equivalents of chloride retained within the generator. The chloride content of the generator thus serves as an indicator of chloramine efficiency.

Example II

An amine which is largely octadecylimino-bis-ethanol $C_{18}H_{37}N(C_2H_4OH)_2$ is available commercially under the trade-name Ethomeen 18/12. It is a cream-colored brittle wax soluble in isopropyl alcohol, benzene and chloroform but not very soluble in hexane. The manufacturer states that the amine has an average molecular weight of 372 suggesting a purity of roughly 95%.

35 g. of Ethomeen 18/12 dissolved in 1000 ml. of xylene was chloraminated for two hours with a $ClNH_2$ flow-rate of approximately 0.0048 mol per minute. A thick cream resulted which did not separate after standing for five weeks. The addition of isopropyl alcohol gave a clear solution and 15 g. of a white crystalline precipitate. This precipitate contained 27% Cl⁻ and was a mixture of approximately a 32% $NH_4Cl$ and 68% 1,1-bis-(2-hydroxyethyl)-1-octadecylhydrazinium chloride. Evaporation of the clear filtrate gave 22 g. of a residue containing 7.5% Cl⁻ and was a 85:15 mixture of product to starting amine. The initial precipitate was extracted with hot chloroform, the extract evaporated and the residue washed with hot ethyl acetate. There resulted 7 g. of a white crystalline solid containing 8.7% Cl⁻ (theory 8.69). A similar hot ethyl acetate washing of the 22 g. residue from the reaction filtrate gave 15 g. of a white solid containing 8.5% Cl⁻. The combined pure product dissolves in water with some foaming and is partially soluble in xylene.

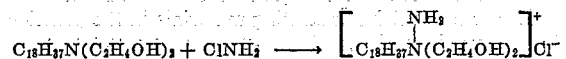

Example III

A chloramine-ammonia gaseous mixture was bubbled into a trichloroethylene solution of tallow-bis-hydroxypolyethoxyethylamine, a product known commercially as Ethomeen T/25. The parent amine is represented by its manufacturer as having the structure:

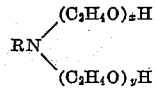

wherein $x+y$ averages 15. The compound has an average molecular weight of 937. R represents tallow, a mixture of fatty moieties previously described and the compound has an average molecular weight of 937. A white precipitate formed in the reaction mixture as the reaction progressed. Extraction of this precipitate with ethanol, gave fine, transparent, off-white prisms of tallow-bis-hydroxypolyethoxyethylhydrazinium chloride, which melted at 198–201° C. and decomposed at 218–233° C.

Example IV

A commercial mixture similar to that of Example III known as Ethomeen S/25 is a mixture of homologs of the general formula:

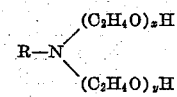

In the formula, R is a fatty hydrocarbon residue derived from soybean oil containing a mixture of hexadecyl, octadecyl, octadecenyl, and octadecadienyl chains as previously described in the specification. In this product $x+y$ can vary from 2 to at least 25 and has an average of 15. Ethomeen S/25 has an experimentally determined neutralization equivalent of 939. Four batches of 200 g. of this amine mixture were each dissolved in 1000 ml. of xylene. The resulting solutions were subjected to a chloramine stream of 0.004 mol per minute from the generator for a period of 60 minutes. They were filtered and the filtrates were combined and resplit into three portions. Each of these solutions were again subjected to chloramination. They were refiltered and rechloraminated, refiltered and the filtrates were evaporated to dryness in a vacuum to give 875 g. of a wet paste. This material was vacuum dried at about 47° C. for 24 hours to give 765.9 g. of about 97% pure 1,1-bis-[2-(hydroxysesquixpentaethoxy)ethyl]-1-soyhydrazinium chloride as a viscous white amber oil. This oil was very soluble in water and also soluble in xylene.

Example V

A commercial product similar to that described in Example IV marketed as Ethomeen 18/60 is described by its manufacturer as having the structural formula:

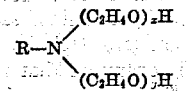

wherein $x+y=50$, and R is derived from commercial stearic acid, largely $C_{18}H_{37}$ with about 6% $C_{16}H_{33}$ and about 1% $C_{18}H_{35}$. The average molecular weight of this compound is given as 2484. The chloramine-ammonia gas mixture was bubbled into a trichloroethylene solution of this base. The reaction resulted in the immediate formation of a precipitate which was primarily ammonium chloride. The solid was extracted with isopropyl alcohol, and this extract was combined with the reaction filtrate. Evaporation of this solution gave as a tan, waxy product, a hydrazinium chloride of the probable structure:

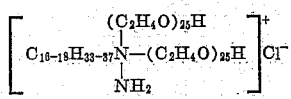

Physically, this product is hard wax with a greasy feel. It was readily soluble in water with considerable foaming. In addition, it was found to be soluble in most of the common solvents except paraffins. The wax was subjected to heat which caused it to soften and run at 180° C. and decompose above 208° C. The novel product formed a water insoluble hexafluorophosphate melting from 50–55° C.

*Example VI*

Since the Ethomeens are steadily water soluble, they can be converted into hydrazinium chlorides in aqueous solution. While this procedure appears to offer no particular advantage, per se, it is demonstrative of the flexibility of the chloramine-tertiary amine reaction. Aqueous chloramine, prepared according to the procedure of R. A. Coleman (U.S. Patent No. 2,404,695) was added to 0.5 g. of Ethomeen 18/60 in 10 ml. of ice water using three equivalents of titrable chloramine to one of the amine. The reaction mixture was allowed to stand overnight at 5° C. The resultant clear solution was treated with a small quantity of sodium bisulphite, cautiously neutralized with acetic acid, and evaporated to dryness. Extraction of the residue with isopropyl alcohol yielded, after evaporation, a 0.1 g. of the waxy product of Example V, soluble in water and benzene, but insoluble in hexane.

*Example VII*

Ethomeen S/60 is a commercially available amine structurally similar to the amine of Example V but where R=the soy mixture detailed in the specification. A 100 g. portion of Ethomeen S/60 was added to a mixture of 800 ml. of Solv D and 200 ml. of chloroform and treated with chloramine according to the procedures described in the previous examples. The reaction mixture was decanted free of solvent and added to an equal volume of acetone. This mixture was stirred and filtered from ammonium chloride. The acetone soluble portion of the precipitate and the residue obtained on evaporation of the filtrate appeared as an ivory paste. This paste was purified by washing with isopropyl alcohol. The washing procedure fractionated the product to some extent into more saturated and less saturated portions. The pasty unfractionated material, 1-soy-1,1-bis-(polyethoxyethyl)hydrazinium chloride, runs clear at about 90° C. and it is very soluble in water. An aqueous solution of this material when treated with aqueous sodium sulfathiazole gives a precipitate, which when separated, appears as mats of fine lustrous plates melting at about 171–172° C. They are poorly soluble in cold water and dispersible hot.

*Example VIII*

A commercial product available as Ethomeen 18/20 averaging $$C_{16-18}H_{33-37}N[(C_2H_5O)_5H]_2$$

was added in a 100 g. portion to one liter of Solv D. This solution was treated for 1 hour with 0.00656 mol of chloramine per minute. The ammonium chloride was filtered off and filtrate concentrated in vacuo to about 250 ml. To the concentrated solution was added 250 ml. of a paraffinic solvent (kerosene), to get two layers. The bottom layer was treated with an equal volume of kerosene and reseparated. The material was vacuum stripped in a nitrogen atmosphere to give 78.8 g. of 1-octadecyl-1,1-bis-(β-hydroxytetraethoxyethyl) hydrazinium chloride. The product was slightly thicker and darker than that of Example II. It forms yellow gums when treated with potassium hexafluorophosphate and potassium mercuriiodide.

*Example IX*

Bis-(2-ethylhexyl)aminoethanol

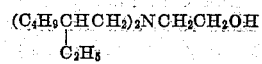

100 ml. was treated with 4 molar equivalents of chloramine. After all the chloramine had reacted, the material was filtered. The filtrate contained chloride, indicating the formation of solvent-soluble hydrazinium chloride. The filtrate was then diluted with 1000 ml. of xylene and exhaustively chloraminated with intermittent filtrations to remove ammonium chloride. The filtrate was finally stripped of solvent, washed well with hexane and a minimum quantity of water. The residue thus obtained appeared as a yellow oil about 88% pure 1,1-bis-(2-ethylhexyl)-1-(2-hydroxyethyl)hydrazinium chloride, containing some unreacted amine. The product was not completely miscible with water, but was soluble in chloroform and xylene. It formed no hexafluorophosphate salt; however, it did form a gummy picrate. When a saturated aqueous solution of the chloride was treated with 20% aqueous potassium iodide, the hydrazinium iodide precipitated as a yellow oil within ten minutes.

*Example X*

Ethomeeen 2C/11 is a commercially available mixture of amines where C denotes coco as described in the specification supra, and 11 denotes an average of 1 $C_2H_4O$ per molecule. A 50 g. portion of Ethomeen 2C/11 was dissolved in 950 ml. of Solv D. This solution was subjected to the chloramine stream from the generator at a rate of 0.0045 mole of chloramine per minute over a period of ninety minutes. After standing overnight, a relatively small quantity of ammonium chloride precipitate formed. The yellow filtrate was evacuated in vacuo, washed well with hexane and vacuum dried to give a very thick yellow-brown oil. This novel oil was dispersible in water and soluble in chloroform. It was purified to a thick clear yellowish paste of 1,1-dicoco-1-(2-hydroxyethyl)hydrazinium chloride which ran clear at about 69° C.

*Example XI*

A branched chain fatty amine mixture containing homologs of the formula $C_{18-24}H_{37-49}NHC_2H_4OH$ is available commercially under the trade-name of Priminox 43. It is a dark viscous liquid which the manufacturer states has a neutralization equivalent of 405 (calculated for $C_{26}H_{55}NO$, 397).

Five g. of this product was refluxed with 50 ml. of formalin and 50 ml. of 90% formic acid for 6 hours, allowed to cool and brought to pH 9.0 by the slow addition of 20% aqueous NaOH at 15–20° C. On standing 6 g. of a dark oil similar in appearance to the starting amine appeared as the upper layer. The separated oil was taken up in 100 ml. of chloroform, washed once with cold water, dried over magnesium sulfate, chloraminated with approximately 5 g. of chloramine and filtered after standing overnight. Evaporation of the filtrate gave a thick dark oil containing 5.2% Cl⁻. The oil was washed with small portions of kerosene and vacuum dried to constant weight at 35° C. yielding 3.8 g. of a thick oil containing 6.2% Cl⁻. The product, 1- methyl-1-(2-hydroxyethyl)-1-alkylhydrazinium chloride, a mixture of homologs of the general formula

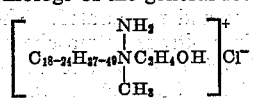

forms stable foamy emulsions in water.

*Example XII*

To further demonstrate the utility of some of our novel compounds rat repellency tests were conducted. These tests comprise isolating a specimen rat for a period of 96 hours with two food containers, one of which contains twenty g. of untreated food and the other 20 g. of food treated with 2% by weight of a material to be tested as a rat repellent. Repellency is measured by means of a Repellency Index, K, obtained by using the formula shown below:

$$K = 100 - \tfrac{1}{100} W(8T_1 - 4T_2 + 2T_3 + _4T)(U_1 + U_2 + 2U_3 + 4U_4 + 8X)$$

In the above formula T is equal to the daily consumption of treated food, U is equal to the daily consumption of untreated food, the subscripts of 1, 2, 3 and 4 refer to the four days during the testing period, X is the weight of untreated food remaining after the fourth day and W is the body weight of the animal in kilograms. A value of 100 represents complete repellency. Samples of our novel soy-bis-(hydroxypolyethoxyethyl)hydrazinium chloride and "tallow"bis-(hydroxysesquiethoxyethyl)hydrazinium chloride were used as the treating material in the tests described hereabove. The first of these compounds gave a repellency index of 93 and the second a repellency index of 92. These results clearly show our novel compounds to be effective as rat repellents.

I claim:

1. As a new chemical compound 1,1-bis-(2-hydroxyethyl)-1-octadecylhydrazinium chloride.

2. As a new chemical compound 1,1-bis-(hydroxypolyethoxyethyl)-1-octadecyldienylhydrazinium chloride.

3. As a new chemical compound 1,1-bis-(2-ethylhexyl)-1-(2-hydroxyethyl)hydrazinium chloride.

4. As a new chemical compound 1,1-bis-octadecyl-1-(hydroxypolyethoxyethyl)hydrazinium chloride.

5. As a new chemical compound 1-benzyl-1-(2-hydroxyethyl)-1-octadecylhydrazinium chloride.

6. New chemical compounds having the general formula:

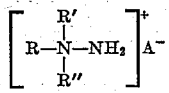

wherein R is a member selected from the group consisting of alkyl, alkenyl and alkadienyl radicals containing 8 to 24 carbon atoms; R' is a member selected from the group consisting of hydroxyloweralkyl, hydroxyloweralkoxyloweralkyl and hydroxypolyloweralkoxyloweralkyl; R'' is a member selected from the group consisting of hydroxyloweralkyl, hydroxyloweralkoxyloweralkyl, hydroxypolyloweralkoxyloweralkyl, benzyl, halobenzyl, and alkyl, alkenyl and alkadienyl radicals containing 1 to 24 carbon atoms; A is a member selected from the group consisting of halide, sulfate phosphate, nitrate and acetate.

7. Compounds according to claim 6 wherein R is an alkyl radical containing 8 to 24 carbon atoms, R' and R'' are hydroxyloweralkyl and A is halide.

8. Compounds according to claim 6 wherein R is an alkenyl radical containing 8 to 24 carbon atoms, R' and R'' are hydroxypolyloweralkoxyloweralkyl and A is halide.

9. Compounds according to claim 6 wherein R is an alkyl radical containing 8 to 24 carbon atoms, R' is hydroxyloweralkyl, R'' is an alkyl radical containing 1 to 24 carbon atoms and A is halide.

10. Compounds according to claim 6 wherein R is an alkyl radical containing 8 to 24 carbon atoms, R' is hydroxypolyloweralkoxyloweralkyl, R'' is an alkyl radical containing 1 to 24 carbon atoms and A is halide.

11. Compounds according to claim 6 wherein R is an alkyl radical containing 8 to 24 carbon atoms, R' is hydroxyloweralkyl, R'' is benzyl and A is halide.

No references cited.